Patented Dec. 13, 1927.

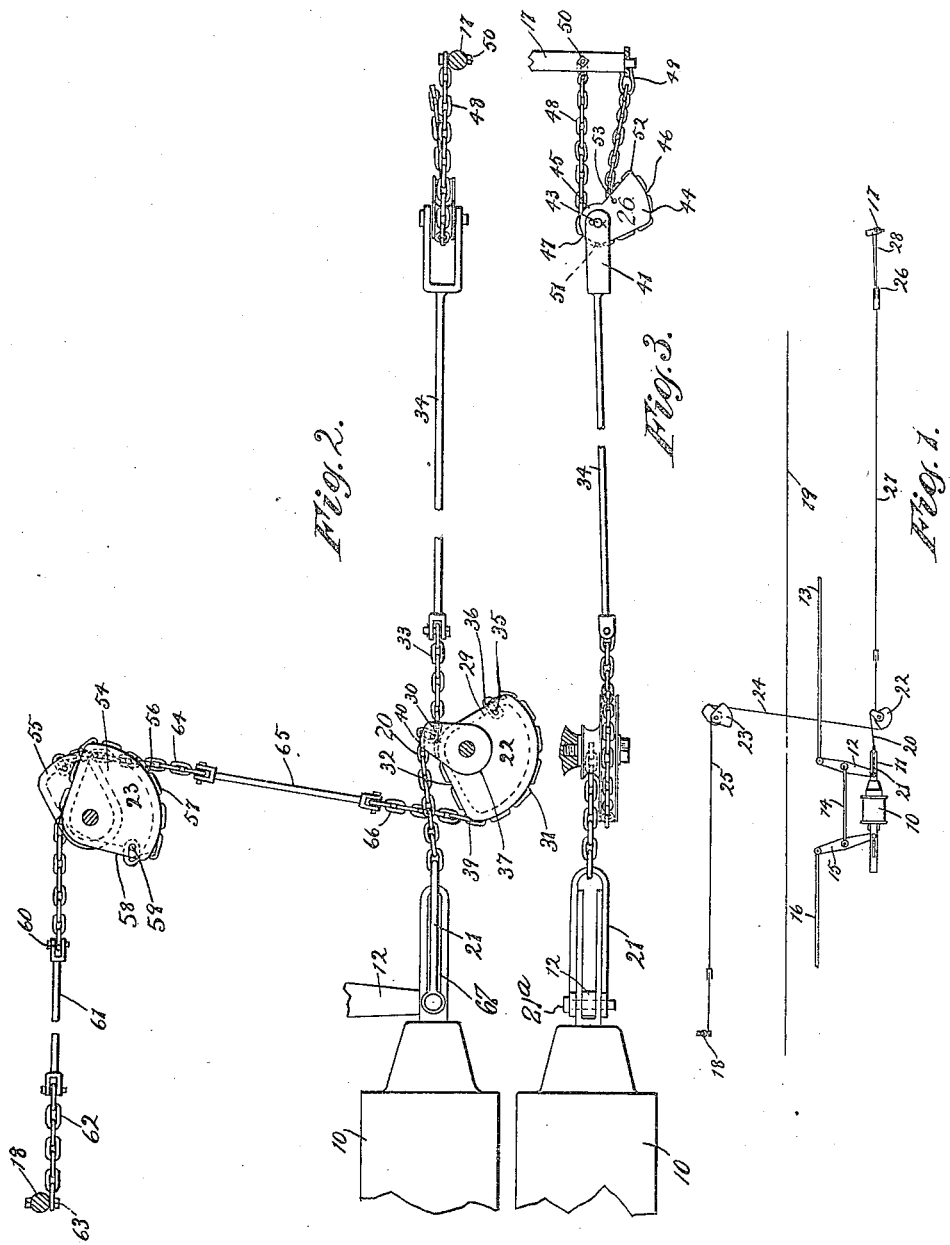

1,652,759

UNITED STATES PATENT OFFICE.

PERCY B. CAMP, OF MAYWOOD, ILLINOIS, ASSIGNOR TO THE UNIVERSAL DRAFT GEAR ATTACHMENT COMPANY, OF CHICAGO, ILLINOIS, A CORPORATION OF ILLINOIS.

BRAKE MECHANISM FOR RAILWAY CARS.

Application filed December 9, 1922. Serial No. 605,889.

This invention relates to brake mechanisms for railway cars and has for its principal object to permit the brakes to be applied by hand with speed and power comparable to the air brake mechanism.

A further object of the invention is to provide an arrangement of connected levers by which power from the brake shaft is first received through short leverage and transmitted through long leverage to gain speed and then the power is received through long leverage and transmitted through short leverage to gain mechanical advantage.

Further objects of the invention will become apparent as the description is read in connection with the accompanying drawings illustrating a selected embodiment of the invention, and in which—

Fig. 1 is a diagrammatic plan view showing the hand brake mechanism and a portion of the air brake mechanism;

Fig. 2 is a plan view on an enlarged scale showing the principal elements of the hand brake mechanism; and Fig. 3 is a side elevation looking at Fig. 2 from the bottom.

Referring to the diagrammatic view in Fig. 1, the reference numeral 10 indicates the usual, or any suitable air cylinder equipped with a push rod 11 through which it operates a lever 12 that in turn operates a brake rod 13 leading to one set of brakes and through the rod 14 and the lever 15 operates a brake rod 16 leading to another set of brakes. The brake staffs are shown at 17 and 18 arranged at opposite ends of the car and usually on opposite sides of the center line indicated by 19. The power of the brake staffs is communicated to the brake lever 12 through a cable or flexible member, as the chain 20, which has a connection 21 with the brake lever 12 at one end and co-operating with a multiplying lever device 22 at its opposite end. A second lever device 23 is connected with the device 22 by a cable 24 and with the brake staff 18 by cable 25. A third lever device 26 is connected with the lever device 22 by cable 27 and with the brake staff 17 by a cable 28.

Referring now to the enlarged views 2 and 3 it will be seen that the device 22 is in the form of a multiplying lever having a staff arm 29 and a brake arm 30. The staff arm has a peripheral working surface of long leverage 31 having sufficient angular extent to maintain this long leverage through a desirable working range. This surface and the leading face 32 are grooved in this instance to receive a chain 33 which, with a rod 34, makes up the cable 27. A shackle 35 connects the end of the chain 33 opposite to that which is fastened to the rod 34 with the following face 36 of the arm 29. A smaller working surface 37 is arranged opposite to the arm 30, or as a part thereof, and this surface, together with the periphery of the arm 30, are grooved for co-operation with the chain 20 which forms the cable in this instance.

It will be obvious from inspection of the drawing that the arrangement of the arms 29 and 30 with respect to each other and the brake staff 17 and the brake lever 12 is such that the initial movement of the brake staff will cause the point 39 of the outer portion of the leading face of the lever 29 to move principally in a direction transverse to the action of the force, while at the same time the point of transmission 40 of the force from the arm 30 to the chain 20 will move principally lengthwise to the latter chain. As the result, this initial movement of the brake staff will cause the arm to quickly take up the slack. As the staff 17 continues to operate the point 39 will move about its circular path until the chain 33 operates with the maximum leverage of the arm 29 and at this point the chain 20 will begin to receive the transmitted force from the surface 37. The result of this is that the power of the brake staff is multiplied by the difference between the leverage of the arm 29 and the working surface 37.

The staff end of the rod 34 is bifurcated at 41 and a reversing lever 26 is journaled therein on a pin or other bearing 43. This lever has a long arm 44 and a short arm 45 oppositely arranged and equipped with peripheral working surfaces 46 and 47 adapted to co-operate with the chain 48 here forming the cable 28 of the diagram shown in Fig. 1. This chain is formed into a bight about the lever with one end anchored to the car at 49 and the other end in winding engagement with the staff 17 at 50. The working surfaces 46 and 47 and the lengths of the lever arms 44 and 45 are arranged to give the speed and power required, together with the necessary working range. As shown, the surface 47 is eccentric with respect to the pin 43 and projects to the left in Fig. 3, as indicated at 51, and the arm 44 has an extension 52 projecting in the opposite direction. The projection 51 serves to slow up the action of the lever during its initial clockwise movement from the position shown in Fig. 3 and to make the step of the live end of the chain from the short arm to the long arm less abrupt. It also serves, when the lever has reversed and the short arm is coacting with the dead end of the chain, to increase the working range of the device. The extension 52 increases the working range of the device in applying braking pressure and provides for a comparatively wide angular movement for the longer arm while it is co-operating with the live end of the chain. Preferably, the right face of the lever 26, as illustrated in Fig. 3, is made concave and a suitable shackle 53 connects the chain to the lever within this concavity. This connection provides a positive driving engagement between the peripheral surface of the lever and the chain and also causes the chain to be gathered up, as shown in Fig. 3, when the parts are in slack condition, thereby preventing undesirable sagging.

When the staff 17 is rotated the chain 48 will cause the lever 26 to revolve clockwise. As the chain first acts upon the short arm, the movement will be multiplied at the end of the long arm and the slack will be quickly taken up. Then the lever will reverse and the live end of the chain will act on the long arm and the short arm will be engaged with the dead end of the chain. The power of the brake shaft thus multiplied is transmitted to the multiplying lever 22 which again multiplies it, as above described.

The multiplying lever 23 is similar to lever 22 but has its arms 54 and 55 arranged differently to operate under the different conditions. The staff arm 54 has the working surface 56 corresponding to the surface 31 and the chain 57 has one end secured to the following face 58 of the arm 54 by a shackle 59 and has its opposite end 60 connected to a rod 61 that in turn is connected with the chain 62 which has winding engagement with the staff 18 at 63. The chain 57 and rod 61 and the chain 62 form in this instance the cable 25 shown in the diagram of Fig. 1. The brake arm 55 is connected by the chain 64 with the rod 65 which in turn is connected with the chain 66 that constitutes a fork of the chain 33 and joins that chain at about the point 39. It will be understood, however, that the chain 66 can be entirely independent of the chain 33 and connect to an arm on the lever 22 similar to the lever 29. From the description of the multiplying lever 22 the operation of the lever 23 will be clear without further explanation.

The arrangement of the arms of the levers and the extent and form of the working surfaces is particularly suitable to a certain class of cars, and those skilled in the art will readily alter these details to suit other conditions. The speed of the device can be increased or reduced by changing the point of application of transmission, or both, of the force developed by the brake staffs, and a wider range and greater power can be had by changing the leverages or the extent of the working surfaces as will be readily recognized. The invention provides a very quick take up if the parts are designed substantially as shown and a very powerful application of the braking pressure as soon as the slack is all in, together with a wide range of braking operation.

The push rod is equipped with a slot 67 through which the connecting pin 21ª fastens and in this way the brakes can be applied by hand without affecting the position of the piston within the cylinder 10.

I claim:

1. In a brake mechanism for railway cars, the combination of a brake staff, a brake lever and an extensible and contractible connection between the brake staff and the brake lever including a rotatably mounted multiplying lever having a staff arm and a brake arm, a connection between the staff arm and the brake staff, a second rotatably mounted multiplying lever having a staff arm and a brake arm, a connection between the brake arm of the first multiplying lever and the staff arm of the second multiplying lever, and a connection between the brake arm of the second multiplying lever and the brake lever, said multiplying levers receiving power through short arms and transmitting it through long arms during their initial movement in applying the brakes, and receiving power through long arms and transmitting it through short arms during the final movement in applying the brakes.

2. In a brake mechanism for railway cars, the combination of a brake staff, a brake lever and an extensible and contractible connection between the brake staff and the brake lever including a rotatably mounted multiplying lever having an individual staff arm and an individual brake arm, a connection between the staff arm and the brake staff, said multiplying lever receiving power through a short arm and transmitting it through a long arm during its initial movement in applying the brakes, and receiving the power through a long arm and transmitting it through a short arm during the final movement in applying the brakes, a second rotatably mounted multiplying lever having a staff arm and an individual brake arm, a winding surface adjacent to said brake arm, a connection between the brake arm of the first multiplying lever and the staff arm of the second multiplying lever, a connection between the brake arm of the second multiplying lever and the brake lever adapted to be wound on said winding surface during the application of the brakes, a second brake staff, and an extensible and contractible connection between the second brake staff and the staff arm of the second multiplying lever.

3. In a brake mechanism for railway cars, the combination of a brake staff, a brake lever, and an extensible and contractible connection between the brake staff and the brake lever, including a rotatably mounted multiplying lever having a staff arm and a brake arm, a connection between the staff arm and the brake staff, a second rotatably mounted multiplying lever having a staff arm and a brake arm, a connection between the brake staff of the first multiplying lever and the staff arm of the second multiplying lever, and a connection between the brake arm of the second multiplying lever and the brake lever, a second brake staff, a reversing lever, a connection between said reversing lever and the staff arm of said second multiplying lever, said reversing lever having arms of different lengths spaced apart and provided with peripheral working surfaces, and a cable running over said lever with one end in winding engagement with said second named brake staff and the other end anchored.

4. In a brake mechanism for railway cars, the combination of a brake staff, a brake lever and an extensible and contractible connection between the brake staff and the brake lever including a rotatably mounted multiplying lever having a staff arm and a brake arm, a connection between the staff arm and the brake staff, a second rotatably mounted multiplying lever arranged laterally of said first named multiplying lever and having a staff arm and a brake arm, a connection between the brake arm of the first multiplying lever and the staff arm of the second multiplying lever, and a connection between the brake arm of the second multiplying lever and the brake lever, said staff arms having peripheral working surfaces of long leverage and said brake arms having peripheral working surfaces of short leverage, said multiplying levers receiving power through short arms and transmitting it through long arms during their initial movement in applying the brakes, and receiving power through long arms and transmitting it through short arms during the final movement in applying the brakes.

5. In a brake mechanism for railway cars, the combination of a brake staff, a brake lever and an extensible and contractible connection between the brake staff and the brake lever, including a rotatably mounted multiplying lever having a staff arm and a brake arm, a connection between the staff arm and the brake staff, a second rotatably mounted multiplying lever having a staff arm and a brake arm, a connection between the brake arm of the first multiplying lever and the staff arm of the second multiplying lever, and a connection between the brake arm of the second multiplying lever and the brake lever, said staff arms having peripheral working surfaces of long leverage and said brake arms having peripheral working surfaces of short leverage, said multiplying levers being so arranged that the relative effective lengths of the staff and brake arms are reversed between the initial and final movement of applying the brakes.

6. In a brake mechanism for railway cars, the combination of a brake staff, a brake lever, and an extensible and contractible connection between the brake staff and the brake lever, including a multiplying lever having an individual brake arm and an individual staff arm, a second multiplying lever arranged laterally of said first named multiplying lever having an individual brake arm and an individual staff arm, a connection between the staff arm of the first multiplying lever and the brake staff, a connection between the brake arm of the first multiplying lever and the staff arm of the second multiplying lever, and a connection between the brake arm of the second multiplying lever and the brake lever, said multiplying levers receiving power through short arms and transmitting it through long arms during their initial movement in applying the brakes, and receiving power through long arms and transmitting it through short arms during the final movement in applying the brakes.

7. In a brake mechanism for railway cars, the combination of a brake staff, a brake lever, and an extensible and contractible connection between the brake staff and the brake lever, including a multiplying lever having a brake arm and a staff arm, a second multiplying lever having a brake arm and a staff arm, a connection between the staff arm of the first multiplying lever and the brake staff, a connection between the brake arm of the first multiplying lever and the staff arm of the second multiplying lever, a connection between the brake arm of the second multiplying lever and the brake lever, a second brake staff, and an extensible and contractible connection between the second brake staff and the staff arm of the second multiplying lever, said multiplying levers being so arranged that the ratio of the effective lengths of said arms is reversed during the application of the brakes.

PERCY B. CAMP.